(12) United States Patent
Miyamoto et al.

(10) Patent No.: US 6,322,259 B1
(45) Date of Patent: Nov. 27, 2001

(54) CAMERA PROVIDED WITH SLIDE COVER

(75) Inventors: Hidenori Miyamoto, Urayasu; Tomoki Nishimura, Kawasaki, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/368,929

(22) Filed: Aug. 5, 1999

(30) Foreign Application Priority Data

| Aug. 6, 1998 | (JP) | 10-222926 |
| Oct. 29, 1998 | (JP) | 10-309024 |
| Oct. 29, 1998 | (JP) | 10-309025 |
| Oct. 29, 1998 | (JP) | 10-309026 |

(51) Int. Cl.$^7$ ............... G03B 17/00; G03B 17/02
(52) U.S. Cl. ............... 396/448; 396/538
(58) Field of Search ............... 396/448, 535, 396/538, 439, 539

(56) References Cited

U.S. PATENT DOCUMENTS

| 3,938,170 | * | 2/1976 | Winkler et al. | 396/448 |
| 4,219,265 | * | 8/1980 | Waaske | 396/448 |
| 4,240,735 | * | 12/1980 | Maitani et al. | 396/448 |
| 4,601,562 | * | 7/1986 | Yone yama et al. | 396/448 |
| 5,604,557 | * | 2/1997 | Kobayashi et al. | 396/538 |
| 6,086,266 | * | 7/2000 | Fujisaki | 396/448 |

FOREIGN PATENT DOCUMENTS

| A-10-104711 | 4/1998 | (JP) . |
| A-10-104712 | 4/1998 | (JP) . |

\* cited by examiner

*Primary Examiner*—Christopher E. Mahoney
(74) *Attorney, Agent, or Firm*—Oliff & Berridge PLC

(57) ABSTRACT

A camera includes: a camera main body; a slide cover that makes a sliding movement between a camera non-operating position, at which, at least, a viewfinder objective lens window, a viewfinder eyepiece window, a function selection unit operated to select camera functions at the camera main body are covered, and a camera operating position at which the viewfinder objective lens window, the viewfinder eyepiece window and the function selection unit are exposed; and a loading unit that allows loading and removal of an image recording medium, regardless of whether the slide cover is at the operating position or the non-operating position.

5 Claims, 16 Drawing Sheets

FIG. 4B
FIG. 4A
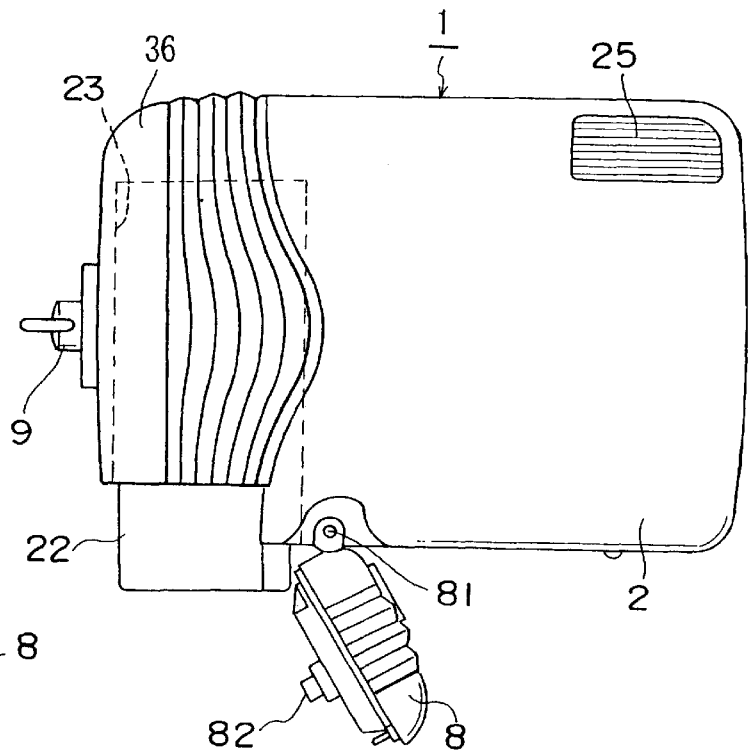
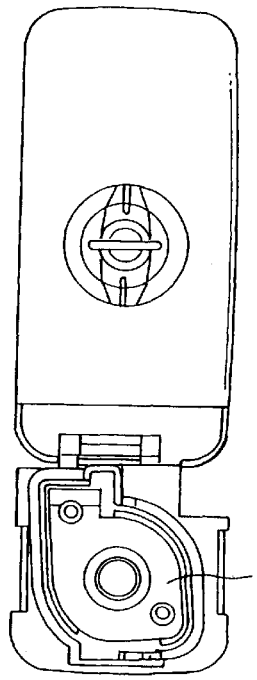
FIG. 4C
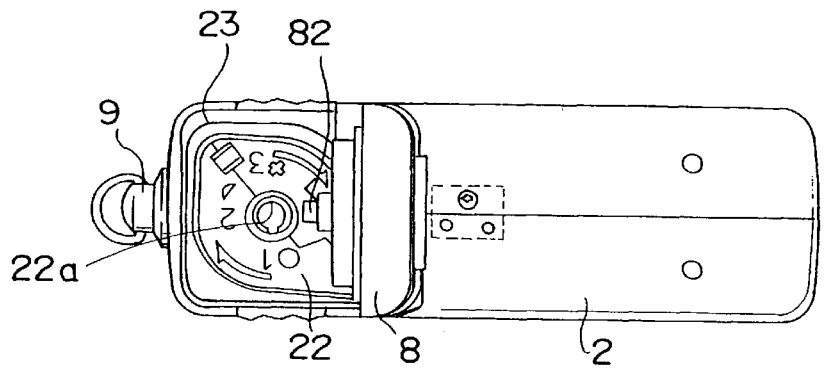

CAMERA PROVIDED WITH SLIDE COVER

INCORPORATION BY REFERENCE

The disclosures of the following priority applications are herein incorporated by reference:

Japanese Patent Application No. 10-222926 filed Aug. 6, 1998

Japanese Patent Application No. 10-309024 filed Oct. 29, 1998

Japanese Patent Application No. 10-309025 filed Oct. 29, 1998

Japanese Patent Application No. 10-309026 filed Oct. 29, 1998

BACKGROUND OF THE INVENTION

1. Field of the Invention

The present invention relates to a camera provided with a slide cover.

2. Description of the Related Art

There are cameras having a sheath-type (capsule-type) slide cover provided to protect the taking lens and the like in the prior art (disclosed in Japanese Laid-Open Patent Publication No. H10-104711 and Japanese Laid-open Patent Publication No. H10-104712, for instance). In these cameras, the access lid of the film cartridge chamber in which a film cartridge is loaded is covered by a slide cover when the slide cover is closed.

Thus, when loading or replacing a film cartridge while the camera is not in an operating state (while the slide cover is closed), the slide cover must be slid until the access lid of the film cartridge chamber becomes exposed to the outside of the slide cover or the slide cover must be completely disengaged from the camera main body. This poses a problem in that loading or replacing the film cartridge becomes a time-consuming, inconvenient procedure.

SUMMARY OF THE INVENTION

An object of the present invention is to provide a camera in which a film cartridge can be loaded or removed without having to move or disengage the slide cover when the camera is not in an operating state.

In order to achieve the object described above, a camera according to the present invention, comprises: a camera main body; a slide cover that makes a sliding movement between a camera non-operating position, at which, at least, a viewfinder objective lens window, a viewfinder eyepiece window, a function selection unit operated to select camera functions at the camera main body are covered, and a camera operating position at which the viewfinder objective lens window, the viewfinder eyepiece window and the function selection unit are exposed; and a loading unit that allows loading and removal of an image recording medium, regardless of whether the slide cover is at the operating position or the non-operating position.

Another camera comprises: a camera main body; a sheath shaped slide cover that makes a sliding movement between a camera non-operating position at which, at least a lens barrel, a viewfinder objective lens window, a viewfinder eyepiece window and a battery chamber lid that opens and closes a battery chamber at the camera main body are covered and a camera operating position at which the lens barrel, the viewfinder objective lens window, the viewfinder eyepiece window and the battery chamber lid are exposed, the camera main body being sheathed into the sheath shaped slide cover at the camera non-operating position; and a cartridge chamber lid that opens and closes a film cartridge chamber where a film cartridge is loaded and is provided in an area of the camera main body that is exposed at all times regardless of the position of the slide cover.

In this camera, preferably, the battery chamber lid and the cartridge chamber lid are provided on a single surface of the camera main body.

Also, preferably, a tripod mount that secures the camera to a tripod and is provided at the cartridge chamber lid.

Also, preferably, the camera further comprises a flash light-emitting unit, and the flash light-emitting unit is provided at a predetermined position on the slide cover so that the flash light-emitting unit is positioned further away from the lens barrel when the slide cover is at the camera operating position compared to when the slide cover is at the camera non-operating position.

BRIEF DESCRIPTION OF THE DRAWINGS

FIGS. 4A through 4C illustrate the film cartridge replacement procedure, with FIG. 4A presenting a front view, FIG. 4B presenting a left side elevation and FIG. 4C presenting a bottom view;

DESCRIPTION OF THE PREFERRED EMBODIMENT

First Embodiment

Figure 1A:
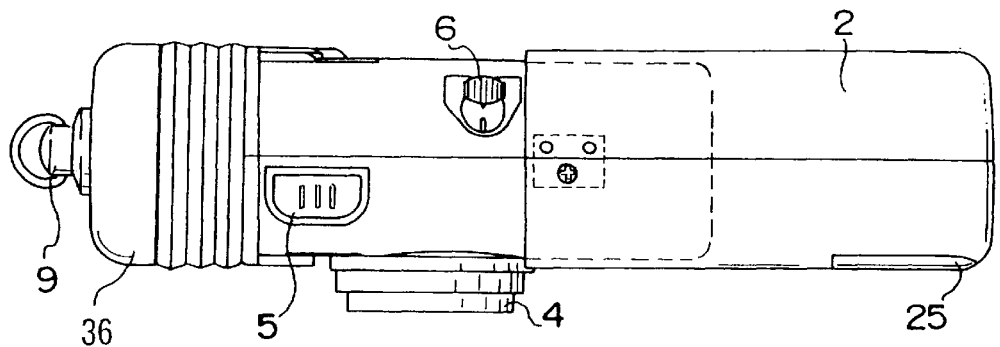
FIG. 1A shows the camera in an operating state, viewed from above.
Figure 1B:
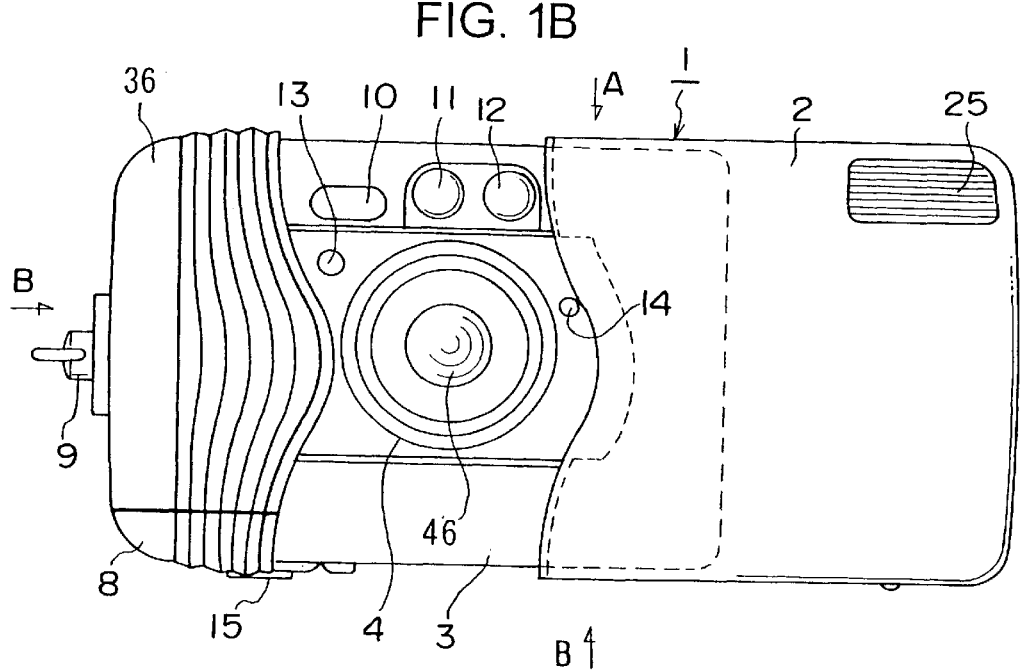
FIG. 1B is a front view of the camera in an operating state.
Figure 1C:
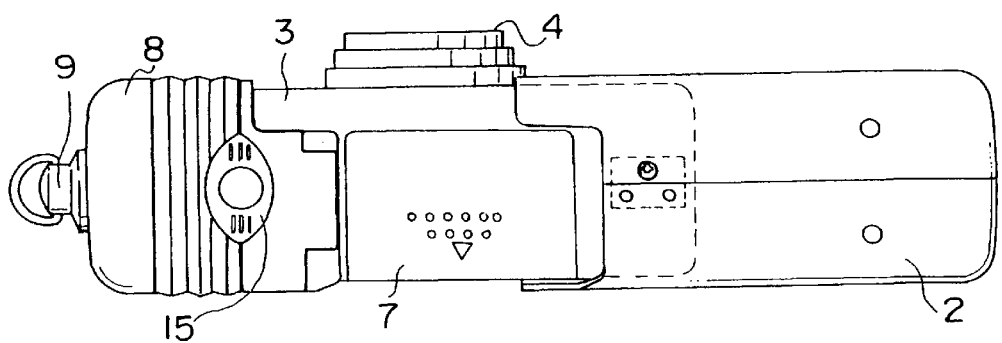
FIG. 1C shows the camera in an operating state, viewed from below.
Figure 2:
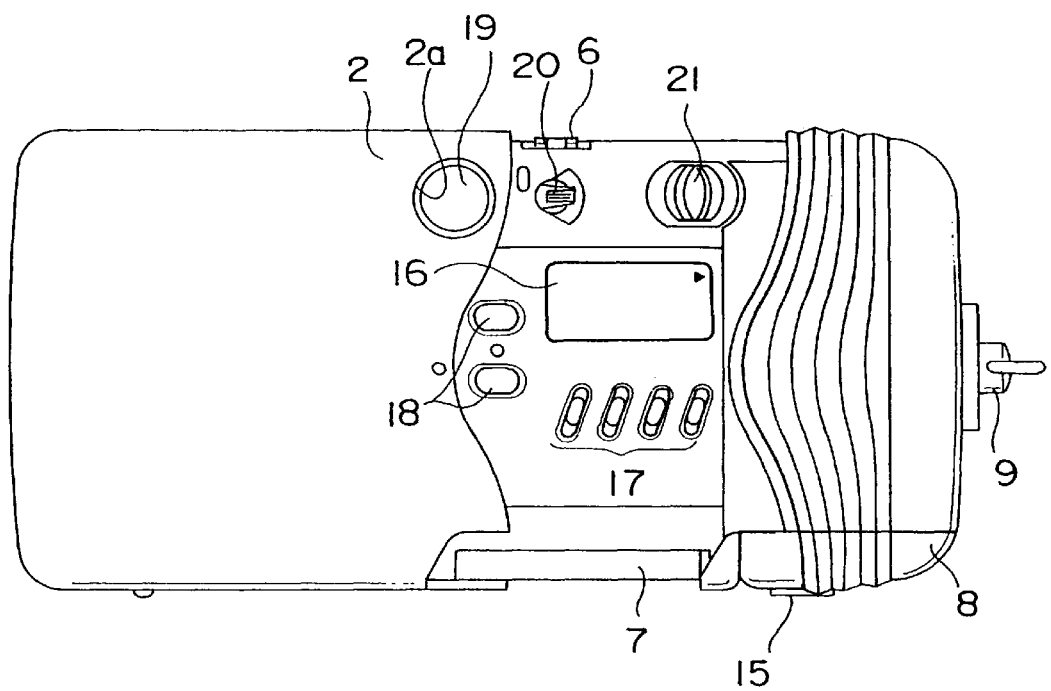
FIG. 2 is a rear view of the camera in an operating state.

The following is an explanation of the first embodiment of the present invention given in reference to FIG. 1A through FIG. 5C. FIGS. 1A through 1C and FIG. 2 illustrate external views of the camera in an operating or using state, with FIG. 1B presenting a front view of the camera 1, FIG. 1A presenting a top view of the camera 1 from above (direction A in FIG. 1B) and FIG. 1C presenting a bottom view of the camera 1 from below (direction B in FIG. 1B). In addition, FIG. 2 is a rear view of the camera. FIGS. 3A through 3C are external views of the camera in a non-operating or non-using state, with FIG. 3A presenting a top view, FIG. 3B presenting a front view and FIG. 3C presenting a bottom view.

Figure 3A:
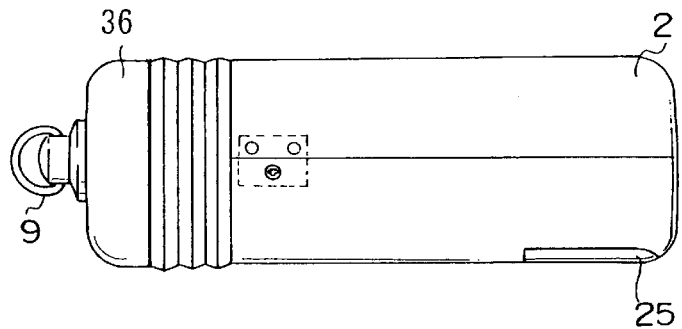
FIG. 3A is a top view of the camera in a non-operating state.
Figure 3B:
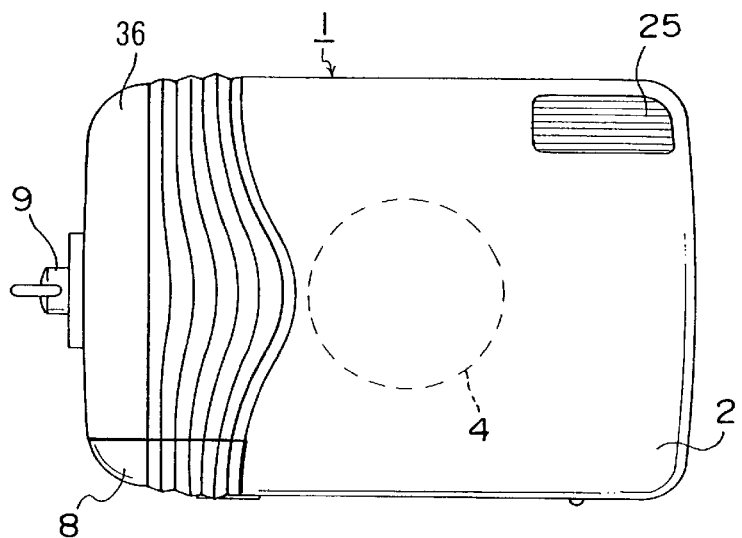
FIG. 3B is a front view of the camera in a non-operating state.
Figure 3C:
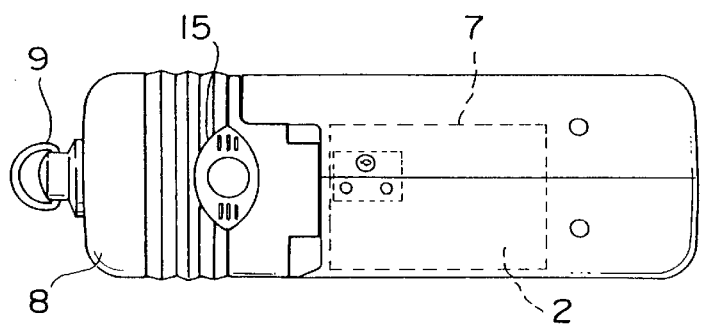
FIG. 3C is a bottom view of the camera in a non-operating state.

A sheath-type slide cover 2 is a sheath-shaped or capsule-type cover with a rectangular cross section having a bottom, and a camera main body 3 is housed in its hollow portion. A guide (not shown) that connects the slide cover 2 and the camera main body 3 is provided between the slide cover 2 and the camera main body 3, and the slide cover 2 is capable of moving between a camera operating position, at which the camera main body 3 is exposed, as illustrated in FIGS. 1A through 2, and a camera non-operating position, at which the camera main body 3 is covered by the slide cover 2 and housed inside the slide cover 2 (in the hollow portion) as illustrated in FIGS. 3A through 3C. When the slide cover 2 is closed as illustrated in FIGS. 3A through 3C, the slide cover 2 merges with a fixed cover unit 36 which is formed as an integrated part of the camera main body 3 to become part of the camera's external form. In the following explanation, the position of the slide cover 2 in FIGS. 1A through 2 is referred to as the camera operating position and the position of the slide cover 2 in FIGS. 3A through 3C is referred to as the camera non-operating position.

When the slide cover 2 is opened to the camera operating position, as illustrated in FIGS. 1A through 2 during a camera operation, a lens barrel 4 that holds a taking lens 46 is delivered or protruded to a specific position from the camera main body 3 and the camera enters a photographing standby state. A shutter release button 5 and a selector switch 6 with which the print type is selected for a printing operation are provided at the upper side of the camera main body 3. The print types that may be selected include a wide type H, a standard type C and a panorama type P, and when one of them is selected through the selector switch 6, the frame of the visual field at the viewfinder optical system is switched in correspondence to the selected print type.

At the bottom side of the camera main body 3, a battery chamber lid 7 that opens/closes a battery chamber (not shown) where a battery for power supply is loaded is provided, and a cartridge chamber lid 8 that opens/closes a film cartridge chamber where a film cartridge is loaded, is provided at the bottom side of the fixed cover unit 36 provided adjacent to the battery chamber lid 7. At the cartridge chamber lid 8, a tripod mount (female mounting screw) 15 for securing the camera to a tripod is provided. It is to be noted that reference number 9 indicates a lock release switch that is operated to release the cartridge chamber lid 8 from a locked state.

As illustrated in FIG. 1B, an AF element 10, a viewfinder objective window 11 and a window 12 for the AF auxiliary lamp that prevents the red-eye phenomenon during a flash photographing operation and enables rangefinding (focusing) with a dark subject are provided above the lens barrel 4. In addition, reference number 13 indicates a remote control light-receiving window and reference number 14 indicates an automatic exposure element that measures the brightness of a subject. A flash light-emitting unit 25 is secured at the slide cover 2, and the flash light-emitting unit 25 moves as part of the slide cover 2 as the slide cover 2 opens and closes. It is to be noted that in order to achieve red-eye prevention during a flash photographing operation, the flash light-emitting unit 25 is provided at the right end of the slide cover 2. In other words, by providing the flash light-emitting unit 25 at the slide cover 2, a large distance can be assured between the flash light-emitting unit 25 and the lens barrel 4 when the slide cover 2 is opened as illustrated in FIG. 1B in the camera operating state to achieve a further improvement in the red-eye prevention effect during flash photographing.

In addition, as illustrated in FIG. 2, a display device 16, on which the date/time, the number of photographs having been taken, the photographing mode and the like are displayed, and switches 17 and 18 that are operated to switch or set the date/time, the photographing mode and the like are provided at the rear side of the camera main body 3. A viewfinder eyepiece window 19, a eyesight adjustment lever 20 used to adjust the diopter of the viewfinder and a zoom switch 21 are provided above the display device 16. It is to be noted that reference number 2a indicates a circular opening formed at the slide cover 2, and the user looks into the viewfinder eyepiece window 19 through the opening 2a.

Furthermore, the power switch is turned off when the slide cover 2 is moved in the closing direction, and a stopper (not shown) restricts the movement of the slide cover 2 until the lens barrel 4 becomes completely retracted into the camera main body. Then, when the slide cover 2 is closed to the camera non-operating position as illustrated in FIG. 3, the lens barrel 4, the battery chamber lid 7, the display device 16 and the like provided at the camera main body 3, excluding the cartridge chamber lid 8 and the lock release switch 9 provided at the fixed cover unit 36, become covered by the slide cover 2.

FIGS. 4A through 4C illustrate a state in which the cartridge chamber lid 8 is open while the slide cover 2 is at the camera non-operating position, with FIG. 4A presenting a front view of the camera, FIG. 4B presenting a left side elevation of FIG. 4A and FIG. 4C presenting a bottom view of the camera. The cartridge chamber lid 8 can be opened or closed around a shaft 81 as illustrated in the cut-away portion in FIG. 4A and when the lock on the cartridge chamber lid 8 is released by operating the lock release switch 9, the cartridge chamber lid 8 can be opened, as illustrated in FIGS. 4A through 4C. Then, when a film cartridge 22 is inserted in the cartridge chamber 23 and the cartridge chamber lid 8 is closed, a lower fork 82 provided at the cartridge chamber lid 8 becomes fitted into the indented portion of a film take-up shaft 22a. When the cartridge chamber lid 8 is completely closed, the cartridge chamber lid 8 itself becomes locked, and thus, the loading of the film cartridge 22 is completed. As described above, in the camera in this embodiment, the film cartridge 22 can be loaded or replaced even while the slide cover 2 is closed.

Figure 5A:
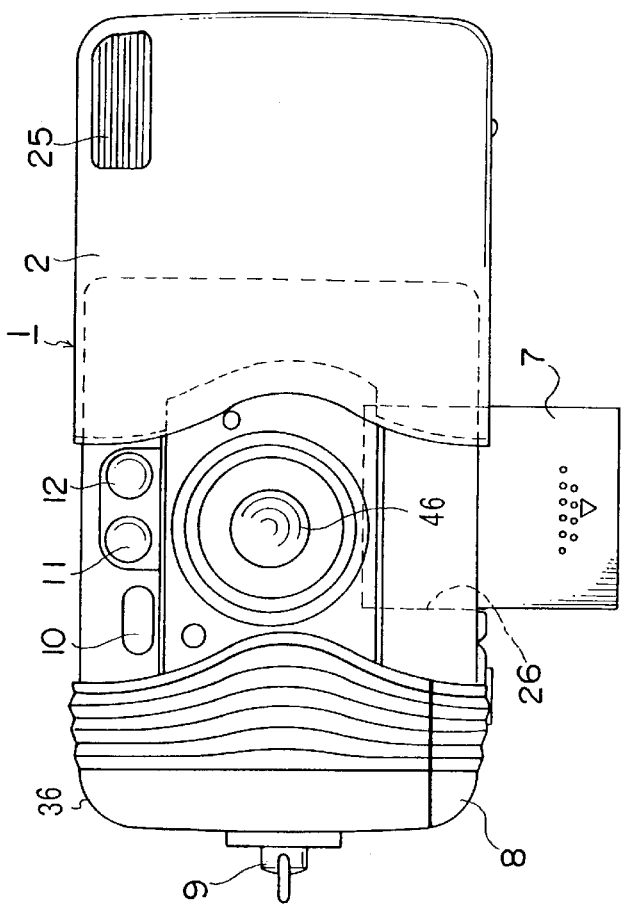
FIGS. 5A through 5C illustrate the battery replacement procedure, with FIG. 5A presenting a front view, FIG. 5B presenting a left side elevation and FIG. 5C presenting a bottom view.
Figure 5B:
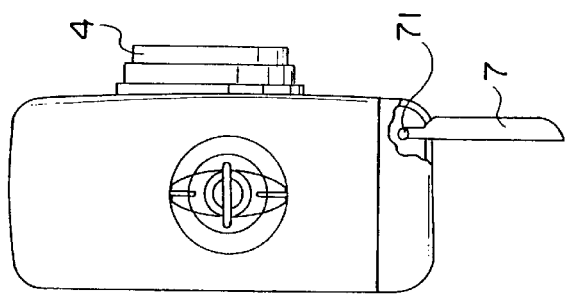
Figure 5C:
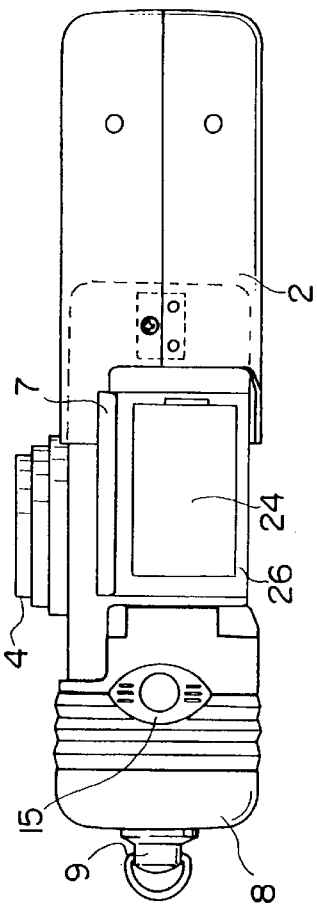

In addition, when replacing the battery, the battery chamber lid 7 is opened to replace the battery 24 after the slide cover 2 is completely opened to the camera operating position, as illustrated in FIGS. 5A through 5C. The battery chamber lid 7 can be opened or closed around a shaft 71, as illustrated in the cut-away portion in FIG. 5B, and the battery 24 is housed in a battery chamber 26, as illustrated in FIG. 5C. It is to be noted that while FIGS. 5A through 5C illustrate a state in which the battery chamber lid 7 is open, the battery chamber lid 7 and the cartridge chamber lid 8 may be set in an open state at the same time. In the embodiment having the cartridge chamber lid 8 and the battery chamber lid 7 both provided at the bottom side of the camera, even when replacing both the battery 24 and the film cartridge 22 by opening the battery chamber lid 7 and the cartridge chamber lid 8 at the same time, there is no risk of dropping the battery 24 or the film cartridge 22 inadvertently, since the camera 1 will be held with the lids 7 and 8 facing upward under normal circumstances.

As has been explained, in the camera according to the first embodiment, since the cartridge chamber lid provided at the camera main body is exposed at all times regardless of the position of the slide cover, a film cartridge can be loaded or removed without having to move the slide cover even while the camera is in a non-operating state.

Since the battery chamber lid and the cartridge chamber lid are provided at the same side of the camera main body, neither the battery nor the film cartridge will be dropped inadvertently even when replacing the battery and the film cartridge at the same time by opening the two lids.

Second Embodiment

Figure 6:
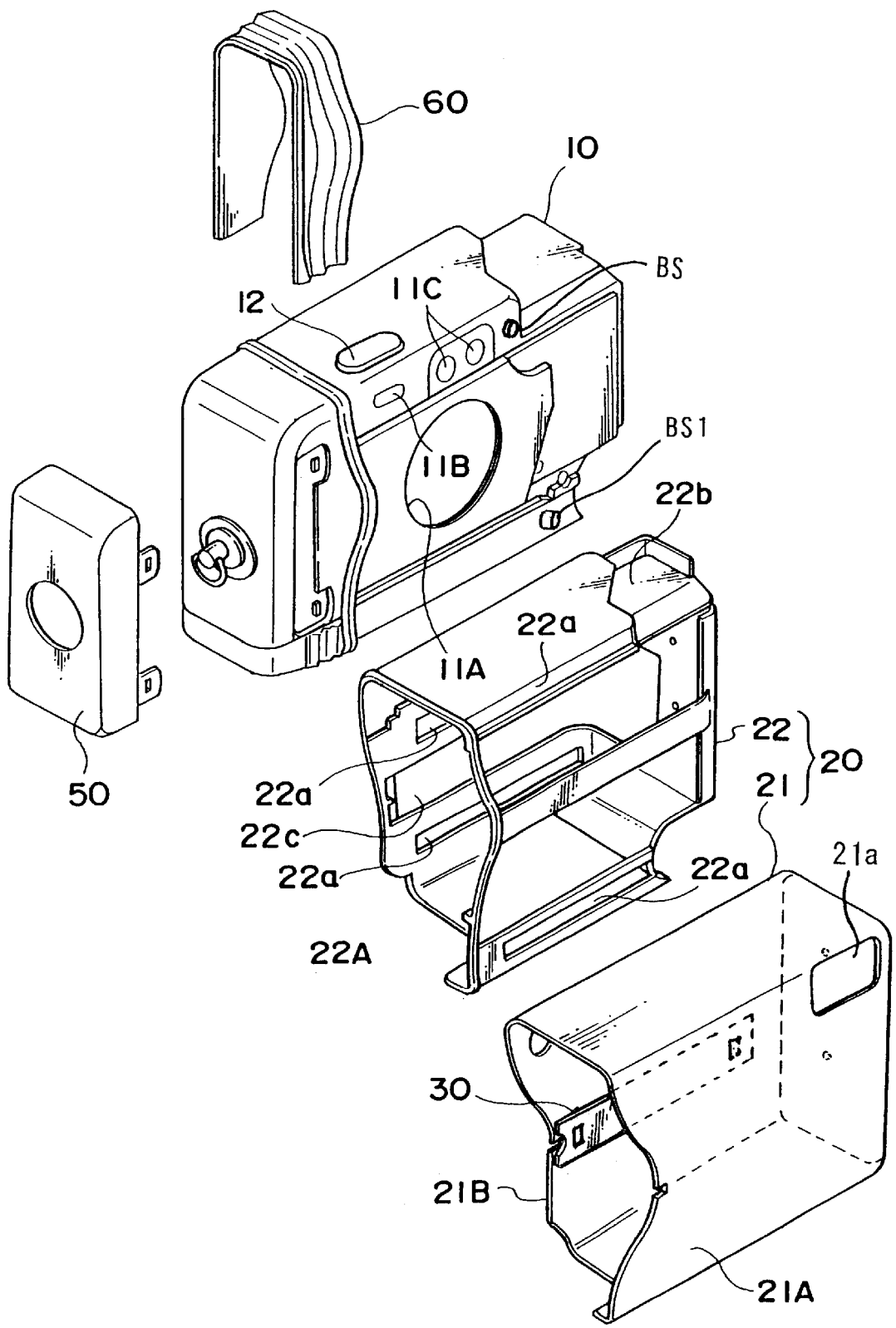
FIG. 6 is an exploded perspective of the camera in an embodiment of the present invention.
Figure 7:
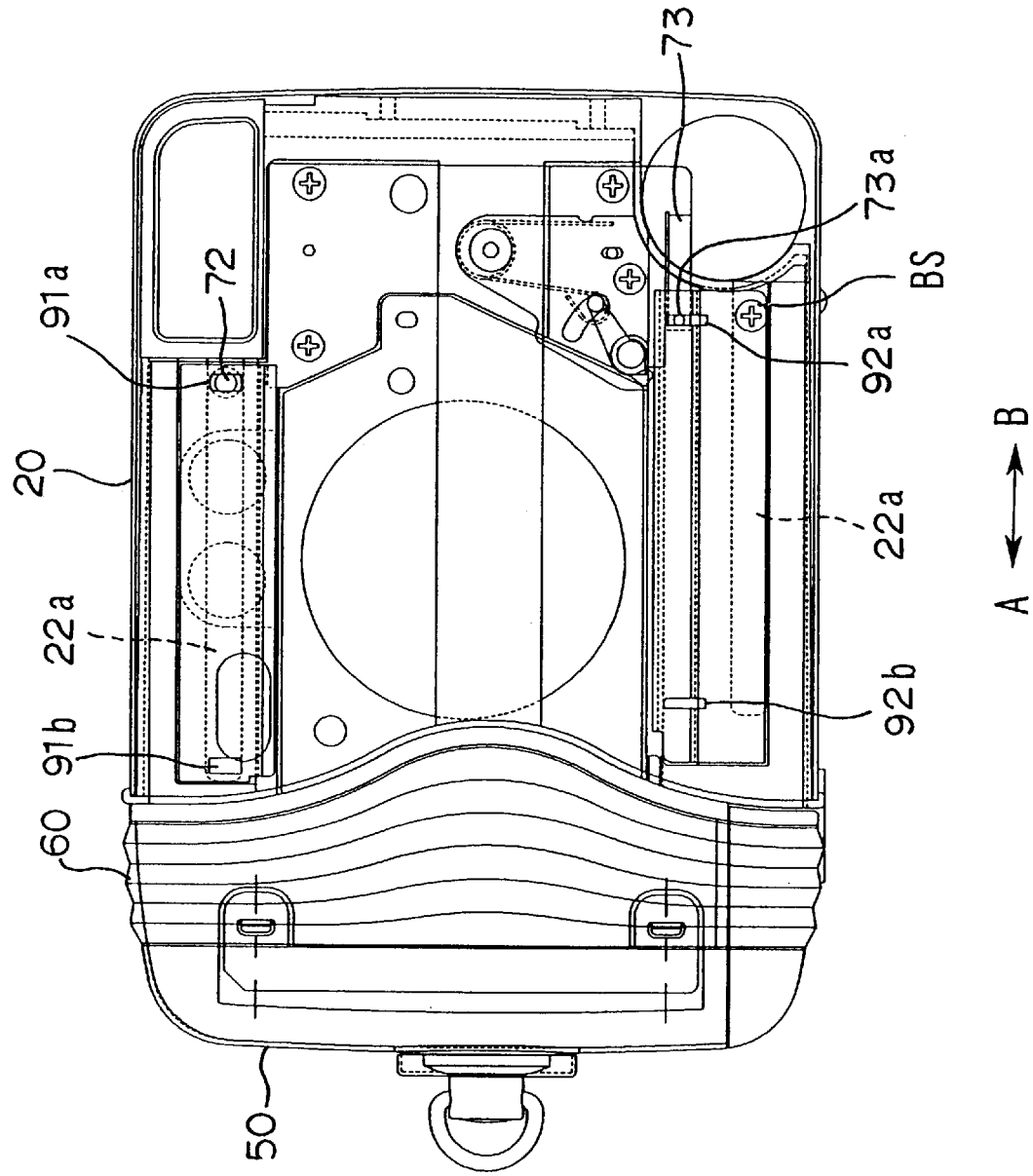
FIG. 7 is a front view of the camera above in a state in which the slide cover is at the closed position.
Figure 8:
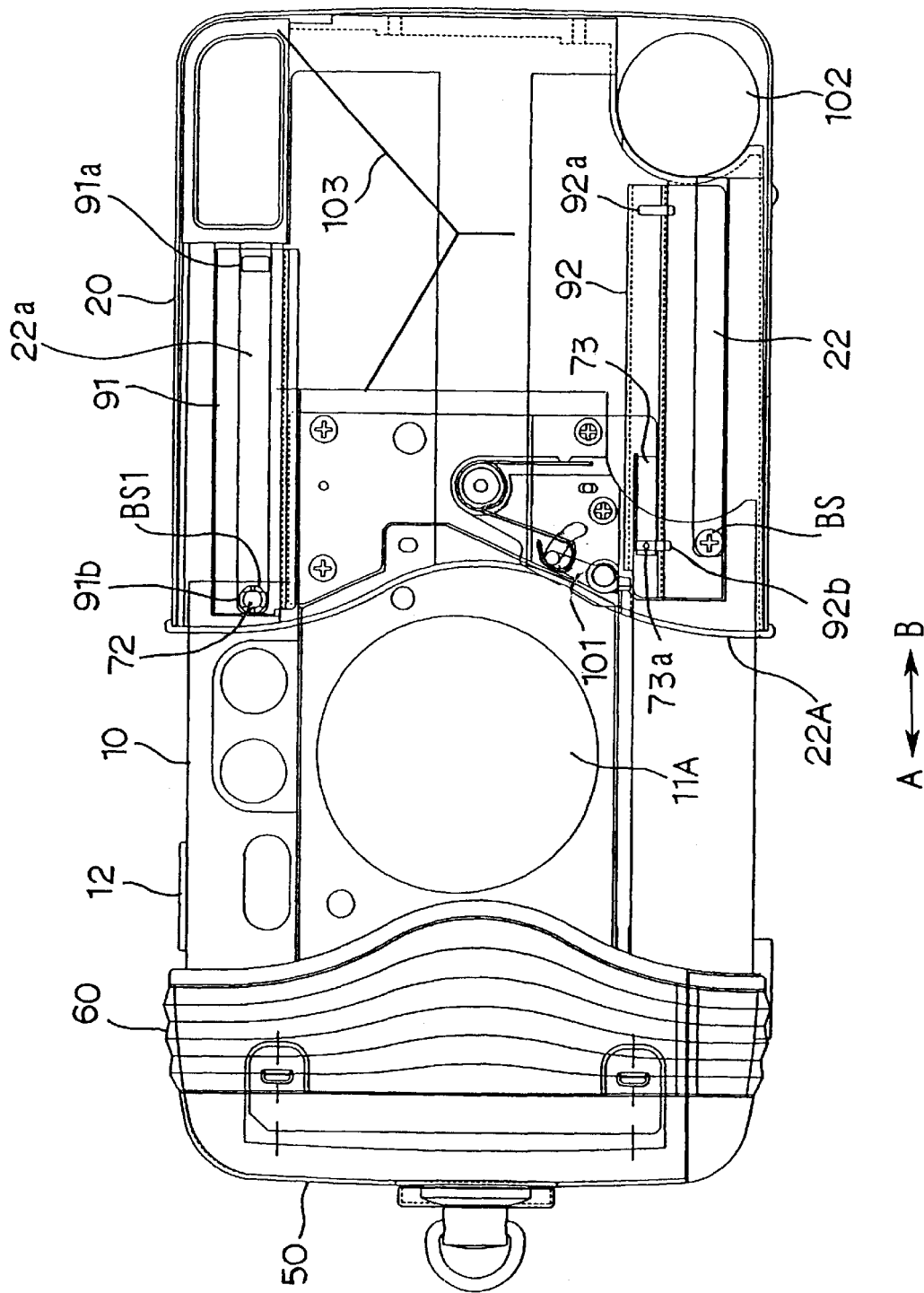
FIG. 8 is a view similar to that presented in FIG. 2, illustrating a state in which the slide cover is at the open position.
Figure 9:
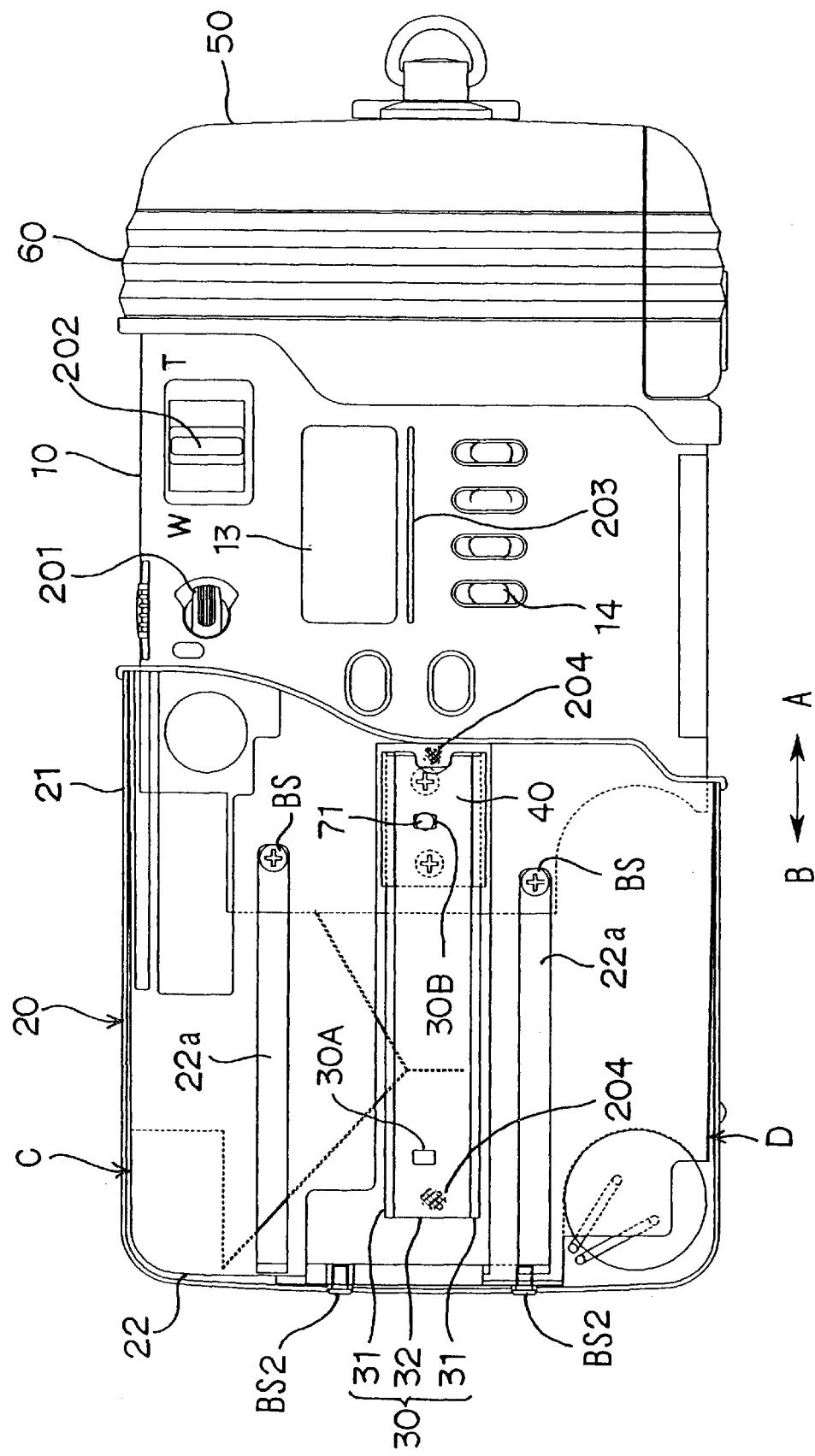
FIG. 9 is a rear view of the camera in a state in which the slide cover is at the open position.

Next, the structure of the slide cover in the camera according to the present invention is explained in reference to FIGS. 6 through 16 as the second embodiment. FIG. 6 is an exploded perspective of the camera according to the present invention. At the front side of a camera main body 10, a lens window 11A at which the taking lens is exposed, a rangefinder window 11B and the viewfinder objective window—AF auxiliary light window 11C are provided, with a shutter release button 12 provided at its upper side and a display device 13 and various buttons 14 provided at its rear surface, as illustrated in FIG. 9. At one end of the camera main body 10, a cover member 50 and a grip member 60 are mounted.

Figure 10:
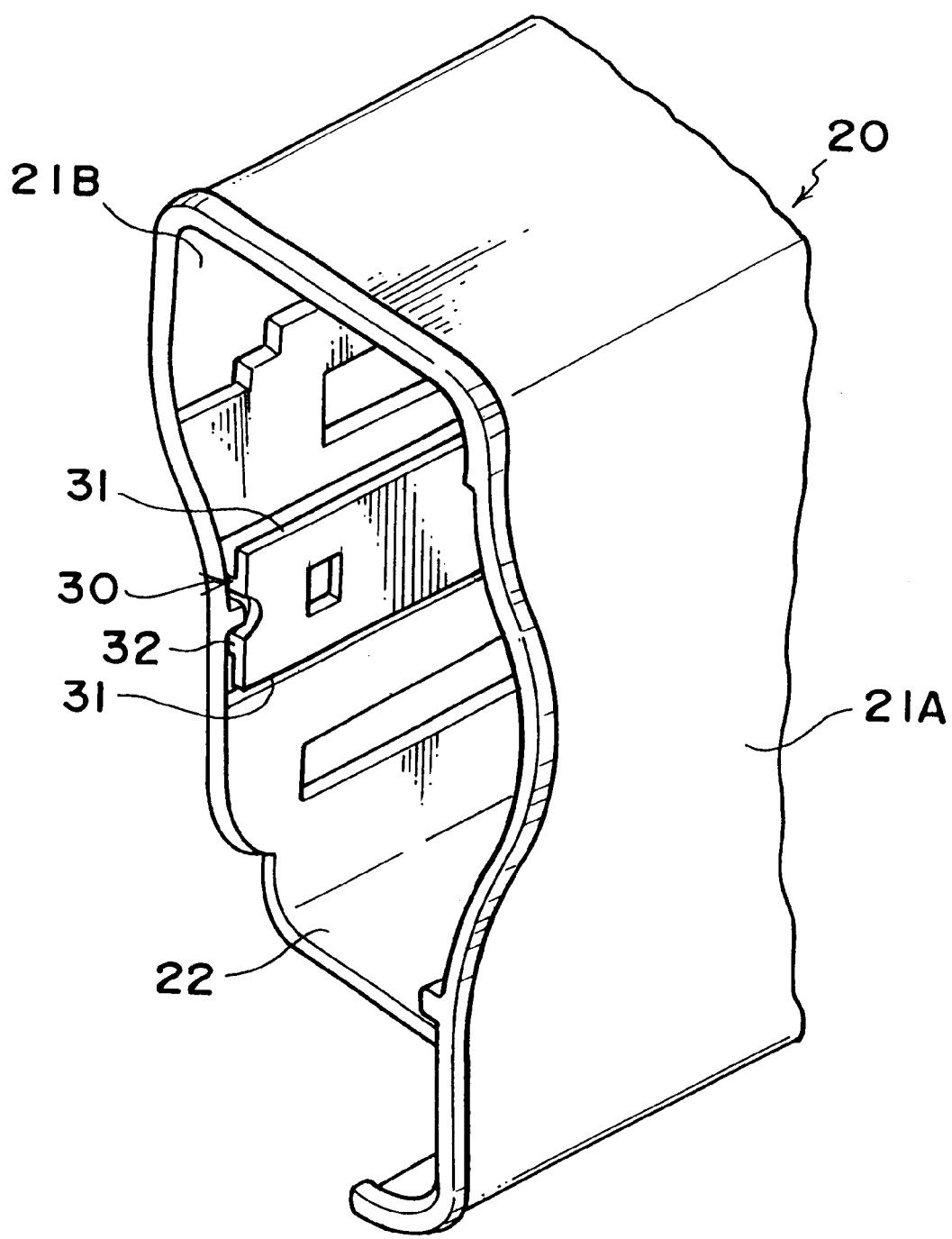
FIG. 10 is a perspective illustrating the end portion of the slide cover in the closing direction.
Figure 12:
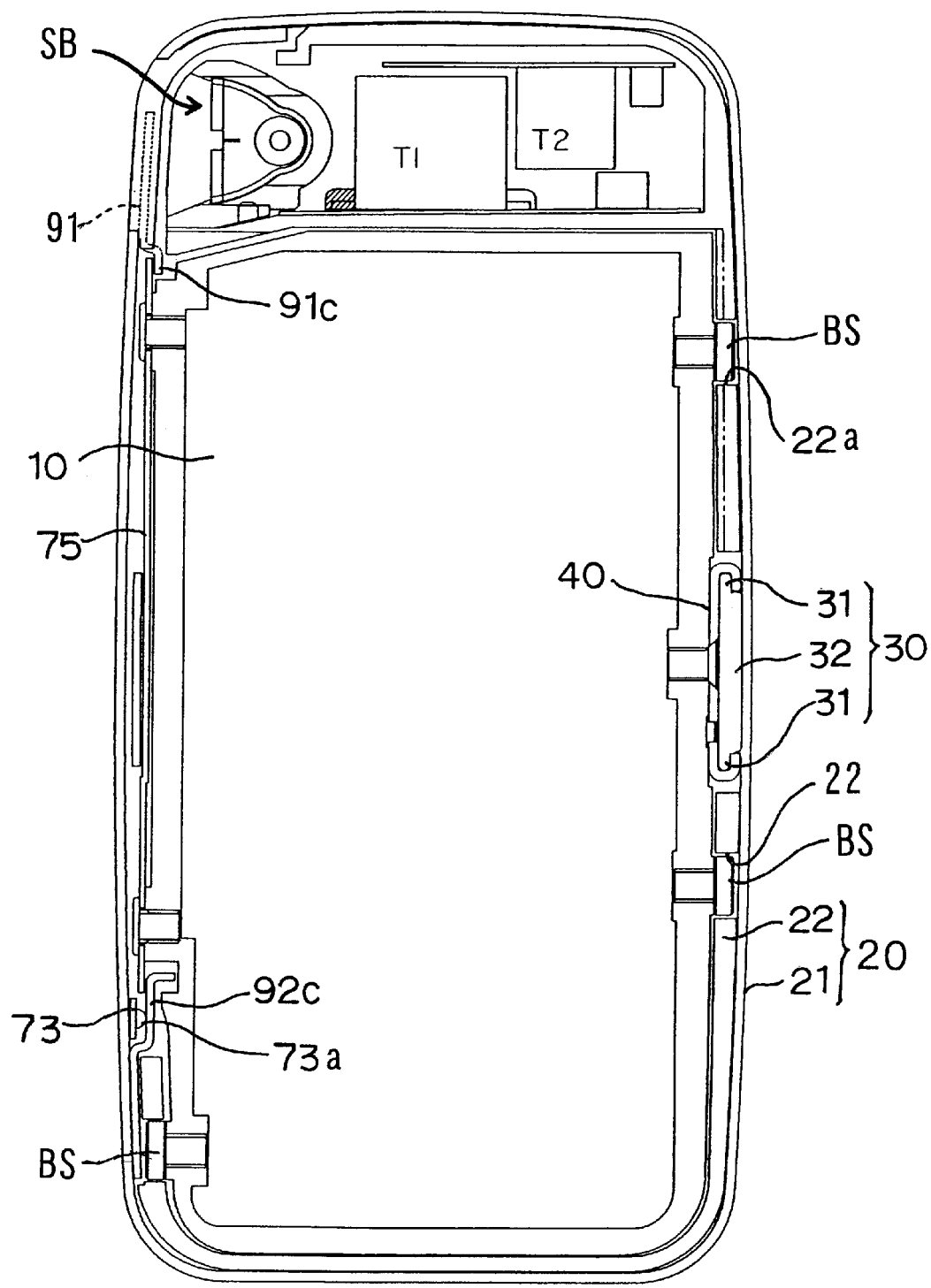
FIG. 12 is a sectional view of a side surface of the camera.

A slide cover 20 comprising a cylindrical or sheath-shaped outer cover 21 constituted of metal and an inner cover 22 formed through plastic molding is capable of making a sliding movement in the lateral direction of the camera (direction A–B) relative to the camera main body 10 between the closed position illustrated in FIG. 7 and the open position illustrated in FIG. 8. A light-emitting window 21a of a flash device is formed at a front plate portion 21A of the outer cover 21, whereas a slide guide member 30 is mounted at the internal surface of a rear plate portion 21B. As illustrated in FIGS. 9, 10 and 12, the guide member 30 is provided with a pair of projected portions, i.e., an upper projected portion 31 and a lower projected portion 31, having a length that corresponds to the stroke distance of the slide cover 20, and a mounting portion 32 which is formed together with the projected portions 31 to constitute an integrated unit is secured to the internal surface of the rear plate portion 21B through welding. The mounting portion 31 is welded at two locations at the two ends of the guide member 30 (the welding spots are indicated by reference number 204 in FIG. 9), and by reducing the number of locations at which it is welded in this manner, the guide member 30 is prevented from becoming deformed while assuring a straight and level run. If the run is not straight and level, the guide member interlocks with the projected portions 31 and the operation is compromised when it moves. However, smooth movement is achieved in the embodiment in which a straight and level run is assured.

Figure 11:
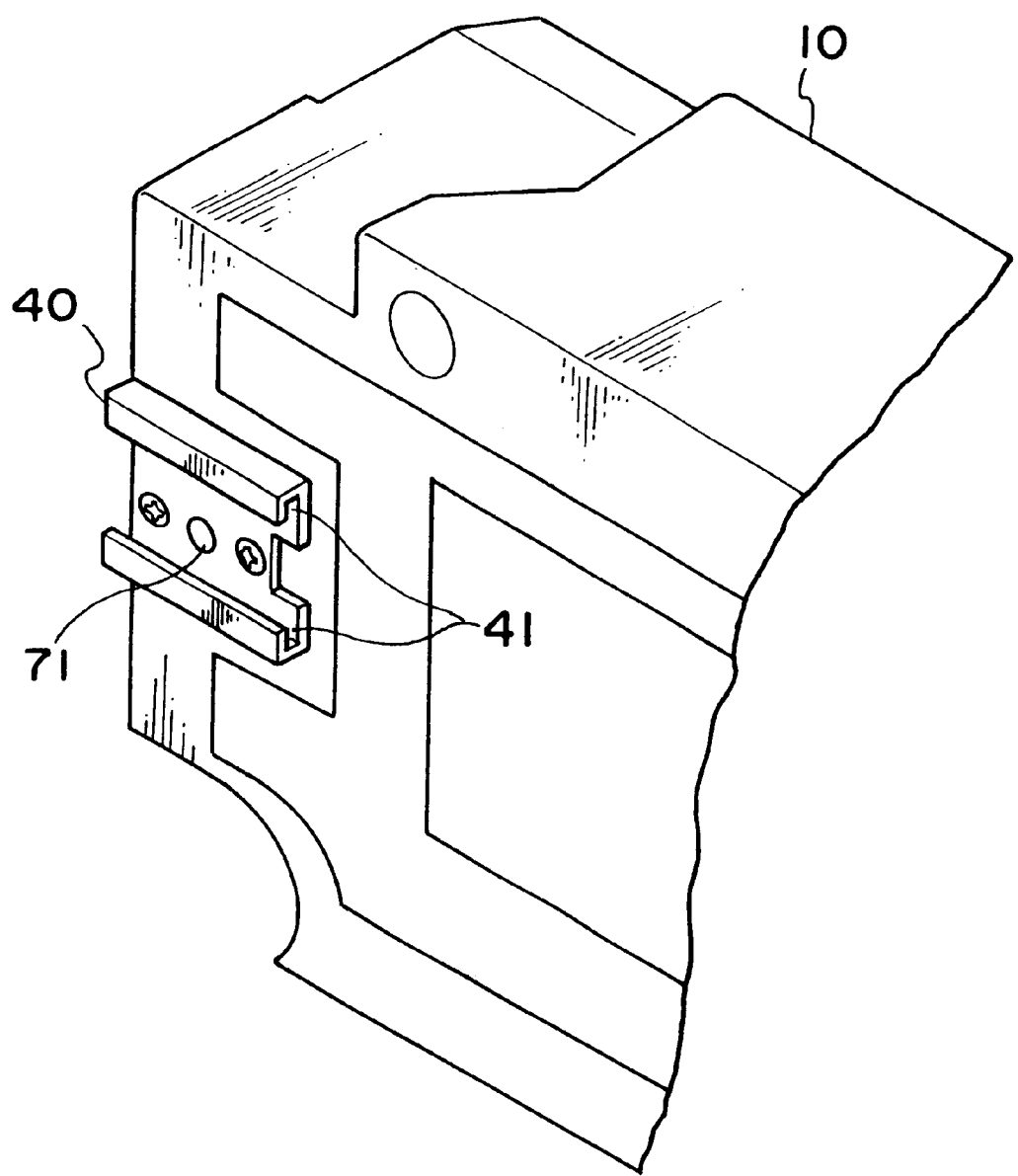
FIG. 11 is a perspective illustrating one end of the camera main body.

In addition, as illustrated in FIGS. 9, 11 and 12, the guide member 40 that connects or engages with the guide member 30 at the outer cover 21 is mounted at the center of the rear side of the camera main body 10. The guide member 40 is provided with a pair of indented portions, i.e., an upper indented portion 41 and a lower indented portion 41, formed by bending the upper and lower portions of a metal plate, and the upper and lower projected portions 31 at the guide member 30 are slidably connected and retained at the indented portions 41. The length of the guide member 41 in the lateral direction of the camera is set to be sufficiently smaller than the length of the guide member 30. Consequently, even if the guide member 30 becomes somewhat deformed, the slide cover can still slide smoothly.

A flash device SB (see FIG. 12) is mounted at an indented portion 22b provided at one end of the inner cover 22, and the radiating light from the flash device SB travels through the window 21a at the outer cover 21 to illuminate a subject. Two grooves, i.e., an upper groove 22a and a lower groove 22a, are formed at each of the surfaces of the inner cover 22 located toward the camera front side and toward the camera rear side, and four guide pins BS and BS1 that are to be inserted at these grooves 22a are screwed at the camera main body 10. With the end surfaces of the grooves 22a in the closing direction (direction A) coming in contact with the heads of the guide pins BS and BS1, the movement of the slide cover 20 in the opening direction (direction B) is regulated. In addition, a covering portion 22A that covers the end surface of the outer cover 21 in the closing direction is formed through integrated molding at the end of the inner cover 22 in the closing direction. Furthermore, the upper surface and the lower surface of the inner cover 22 are made to incline so that they approach the central axis of the camera main body in the vertical direction over the areas extending from their ends in the closing direction to their ends in the opening direction, and the front side and the rear side of the inner cover 22 are made to incline so that they approach the central axis of the camera body in the depthwise direction over the areas extending from their ends in the closing direction to their ends in the opening direction. This makes it possible to form the inner cover 22 through molding.

Figure 15:
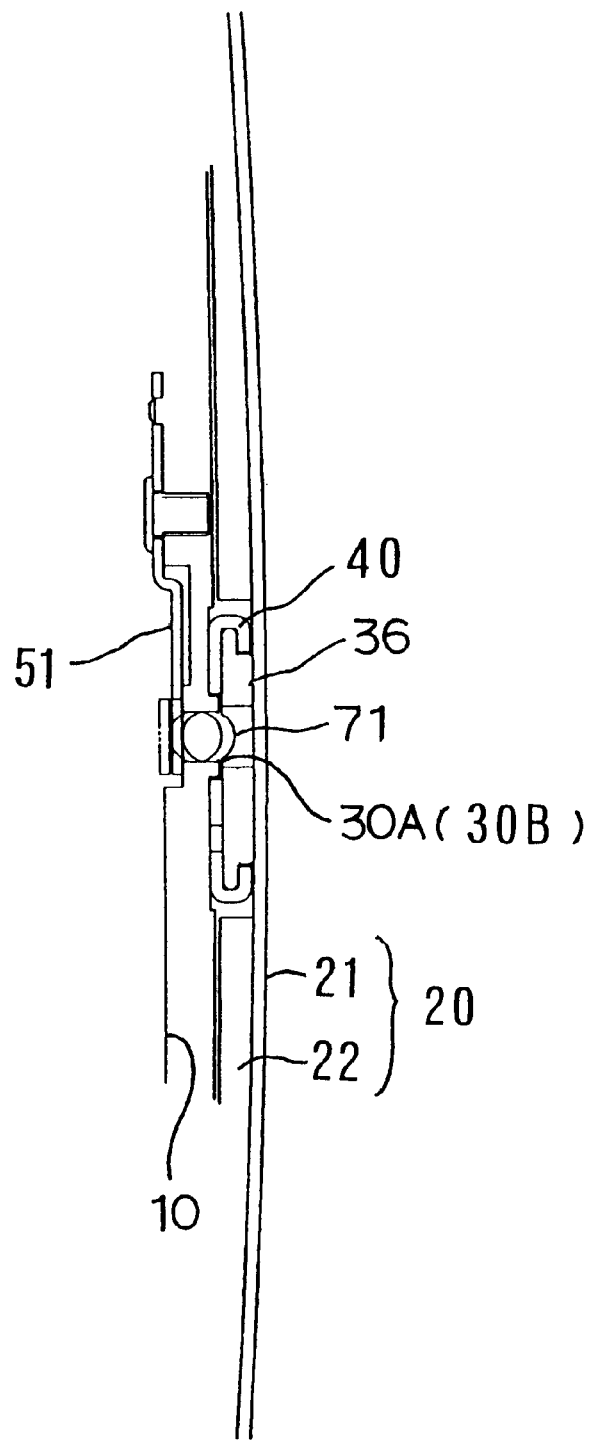
FIG. 15 is a sectional view illustrating details of the click mechanism.
Figure 16:
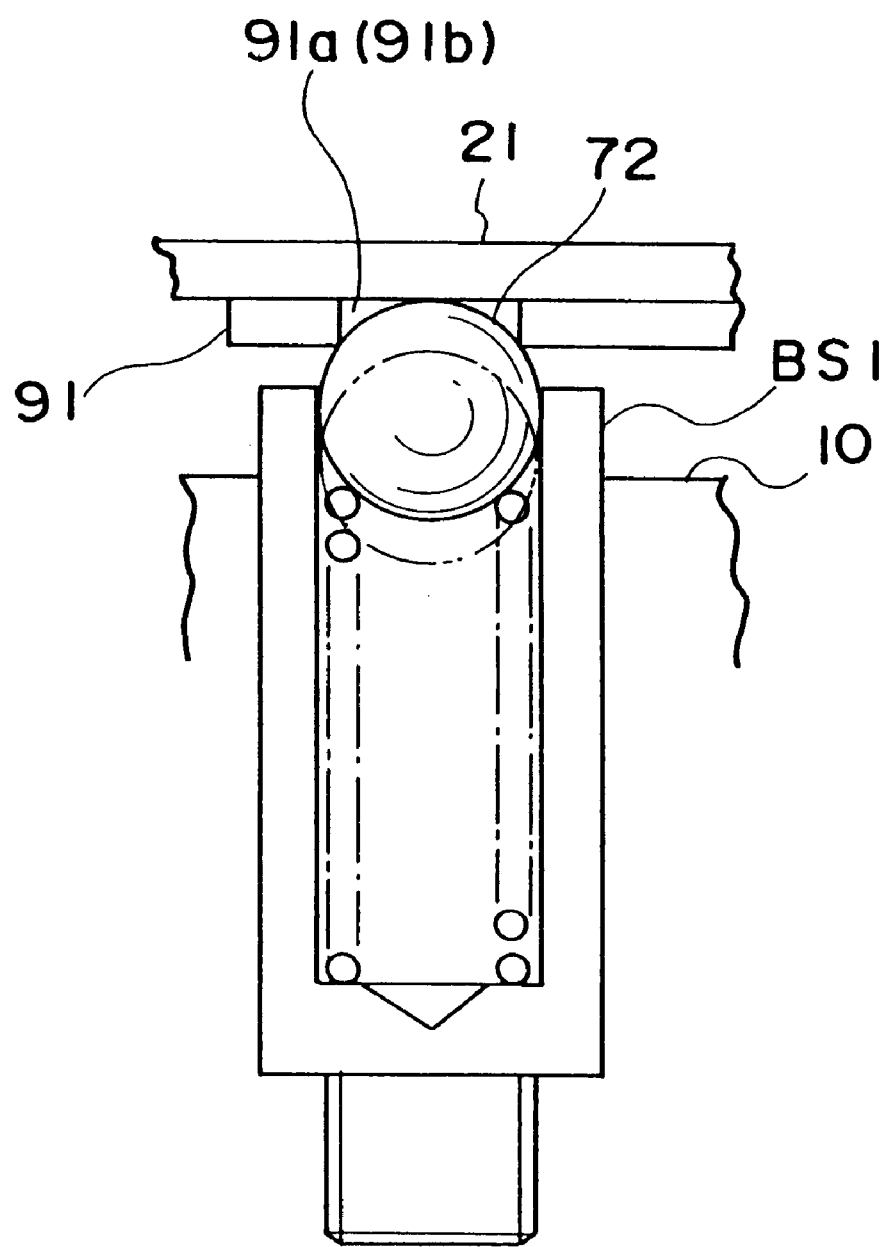
FIG. 16 is a sectional view illustrating details of another click mechanism.

Click mechanisms are provided to secure the slide cover 20 at both the open position and the closed position. Namely, as illustrated in FIG. 15, a click ball 71 is provided at the center of the rear side of the camera main body 10 in the longitudinal direction of the camera, and force is applied by a spring 51 to the click ball 71 toward the rear of the camera through a hole formed at the guide member 40. In addition, at the guide member 30 provided at the slide cover, rectangular holes 30A and 30B are formed at two locations along the left and right direction into which the click ball 71 drops. Also, as illustrated in FIGS. 8 and 16, a click ball 72 is provided at the head of the guide pin BS1 that restricts the movement of the slide cover 20 in the opening direction, via a spring 81, at the front side of the camera main body 10. A plate member 91 is secured to the upper portion of the inner surface of the front plate 21A of the outer cover 21 constituting the slide cover 20, and the click ball 72 is made to drop into holes 91a and 91b provided at two locations at the left and right of the plate member 91. A plate member 73 having a spring property is provided at the lower portion of the front side of the camera main body 10, with its one end (the right side in FIG. 8) secured and a projection 73a formed at its other end. A plate member 92 having holes 92a and 92b at two locations at the left and right is secured to the lower portion of the inner surface of the front plate 21A so that the projection 73a of the plate member 73 can connect by fitting into each of the holes 92a and 92b.

It is to be noted that in FIG. 8, reference number 101 indicates a power switch, reference number 102 indicates a main condenser for the flash device to emit light and reference number 103 indicates a flexible printed board provided to supply power and a light emission signal to the light-emitting circuit of the flash device. The power switch 101 is in an OFF state when the slide cover 20 is at the closed position, and it becomes turned on when the slide cover 20 is slid to the open position. In addition, in FIG. 9, reference number 201 indicates a viewfinder eyesight adjustment lever, reference number 202 indicates a zoom lever and reference number 203 indicates a slide cover receptacle constituted of an elongated projection. The slide cover receptacle 203 receives the inner surface of the sliding slide cover 20 to prevent the cover 20 from coming into contact with another portion of the camera rear side and becoming damaged.

Figure 13:
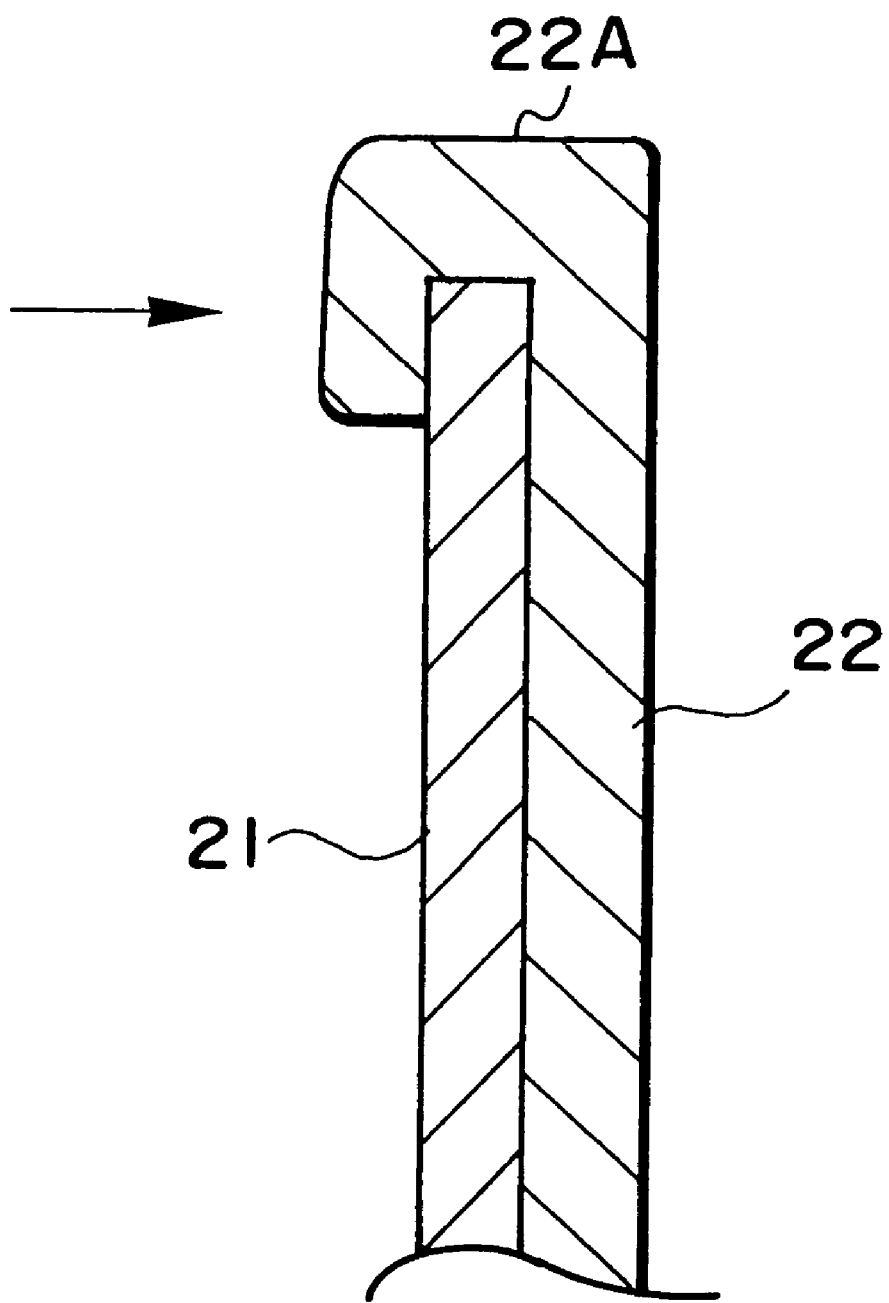
FIG. 13 is a sectional view illustrating the end portion of the slide cover in the closing direction.
Figure 14:
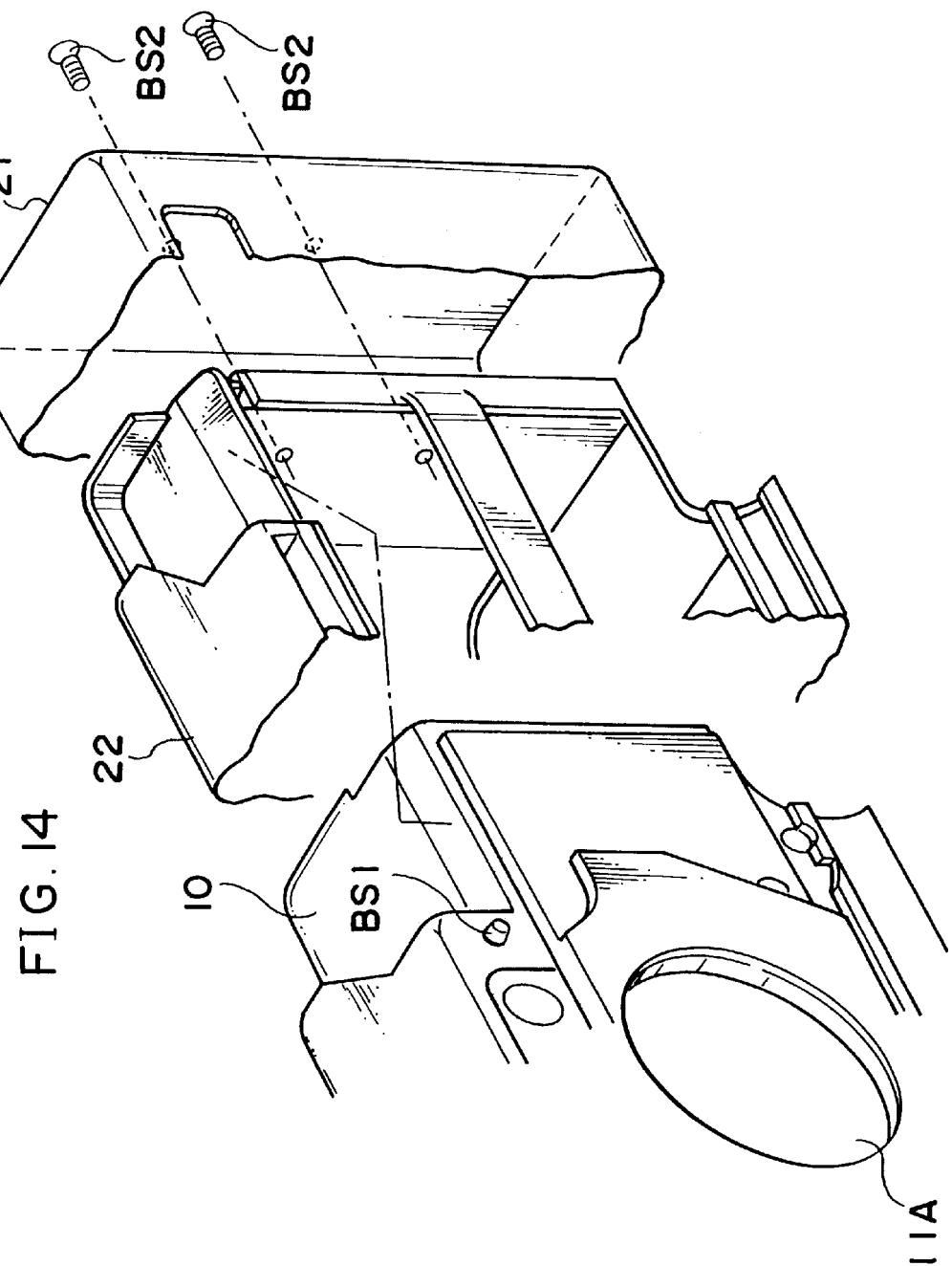
FIG. 14 is a perspective illustrating the method for mounting the slide cover at the camera main body.

Next, the procedure through which the slide cover 20 is mounted at the camera main body 10 is explained below. First, the inner cover 22 of the slide cover 20 itself is externally fitted at the end of the camera main body 10 in direction B. By causing elastic deformation of the plastic inner cover 22 as necessary, the cover can be caused to ride over the projected portions (e.g., the guide member 40) at the camera surface and the heads of the four guide pins BS are inserted at the four grooves 22a at the inner cover 22. The guide member 40 should be exposed through a window portion 22c (see FIG. 6) of the inner cover 22. Then, the outer cover 21 is positioned so that the guide member 30 at the outer cover 21 and the guide member 40 at the camera main body 10 are positionally aligned, and by inserting the upper and lower projected portions 31 at the guide member 30 in the upper and lower indented portions 41 of the guide member 40, the outer cover 21 is moved to cover the inner cover 22. While the inner cover 22 is fitted from the opening direction side into the opening at the outer cover 21 located on the side toward the closing direction during this process, since the outer surface of the inner cover 22 is made to incline toward the center of the camera main body over the area extending from the end in the closing direction toward the end in the opening direction (portions C and D in FIG. 9), the outer cover 21 can be placed over the inner cover with ease. As illustrated in FIG. 13, after the end surface of the outer cover 21 in the closing direction is inserted at the covering portion 22A of the inner cover 22, screws BS2 (see FIG. 14) are screwed into mounting holes formed at the end surfaces of the outer and inner covers 21 and 22 in the opening direction to secure the two covers. Since the two covers are fitted together relatively tightly at the ends of the inner covers 22 and outer covers 21 in the opening direction in this state, any play that may otherwise occur between the two covers is prevented.

In the camera structured as described above, when the slide cover 20 is at the closed position, as illustrated in FIG. 7, its end in the closing direction is in contact with the contact portion of the camera main body 10 to regulate its movement in the closing direction, with the guide member 40 at the camera main body 10 positioned at the end of the guide member 30 at the cover 20 in the opening direction. At this time, the taking lens, the viewfinder objective window 11C and the rangefinder window 11B are covered by the front surface portion 21A of the slide cover 20 and the liquid crystal display device 13 and the various operating buttons 14 are covered by a rear surface portion 21B of the slide cover 20. In addition, the click balls 71 and 72 are dropped into the holes 30A and 91A respectively, with the projection 73a at the plate member 73 connecting with and being retained at the hole 92a. These three click mechanisms secure the slide cover 20 at the closed position to prevent any play of the slide cover 20 in various directions. Play of the slide cover 20 in the vertical direction relative to the camera is mainly prevented by the two click mechanisms provided at the camera front side, whereas play in the depthwise direction is prevented by the three click mechanisms.

When a force is applied to the slide cover 20 in the opening direction, the click balls 71 and 72 and the projection 73a at the plate member 73 recede against the spring force, and with the guide member 30 sliding inside the guide member 40, the movement of the slide cover 20 is guided so that the slide cover 20 moves in the opening direction. As illustrated in FIGS. 8 and 9, when the slide cover 20 reaches the open position, the ends of the four grooves 22a at the inner cover 22 come in contact with the four guide pins BS and BS1 at the camera main body 10 to prevent further movement of the slide cover 20 in the opening direction. At this point, the click balls 71 and 72 drop into the holes 30B and 91b respectively and the projection 73a at the plate member 73 becomes connected with and retained at the hole 92b. As a result, the slide cover 20 is secured at the open position, and play in the slide cover 20 in various directions is prevented in a manner similar to that described above.

When the slide cover 20 is at the open position, the taking lens, the viewfinder objective window 11C, the rangefinder window 11B, the liquid crystal display device 13 and the various operating buttons 14 are exposed to the outside and the camera is set in a photographing enabled state. While the guide member 40 is positioned at the end of the guide member 30 in the closing direction, as illustrated in FIG. 9, the guide member 40 remains covered by the slide cover 20 and therefore, is not exposed to the outside. In addition, since the guide member 30 which has a length that corresponds to the stroke distance (moving distance) of the slide cover 20 is provided at the inner surface of the slide cover 20, it never becomes exposed to the outside regardless of the position of the cover 20. Consequently, the presence of the guide members 30 and 40 does not compromise the visual aspect of the camera in any way whatsoever. Furthermore, since the length of the guide member 40 at the main body can be set sufficiently small, its presence does not impose any restriction whatsoever in regard to the arrangement of the display device and the switches at the rear side.

Since the guide mechanism constituted of the guide members 30 and 40 is provided at the center of the camera in the vertical direction, a single guide mechanism set achieves the desired effect. This is made possible by providing the guide mechanism at the rear side of the camera. If the guide mechanism is provided at the camera front side, on the other hand, the guide mechanism cannot be positioned at the center because of the taking lens provided at the center of the front side, thereby necessitating a guide mechanism to be provided at two locations above and below the taking lens. Play will occur if a guide mechanism is provided only above or below the taking lens. A structure that does not require a guide mechanism to be provided above and below the taking lens, and is provided with a guide mechanism only at one location at the center, achieves the advantage of reduced thickness in the upper and lower portions of the camera. In the camera in the embodiment, too, the slide cover 20 is at its thickest at the central portion where the guide mechanism is provided and becomes thinner toward its upper and lower ends, as illustrated in FIG. 12. Generally, a camera looks thin as long as its upper and lower portions are thin even though its center is considerably thicker, and thus, an improvement in the visual appearance is achieved.

When a force along the depthwise direction of the camera is applied to the slide cover 20, the projected portions 31 of the guide member 30 at the cover come in contact with the wall surfaces of the indented portions 41 of the guide member 40 at the main body to regulate the movement of the slide cover 20 along the direction in which the slide cover would lift off from the front side or the rear side of the camera main body so that play in the cover 20 in the depthwise direction is prevented. In addition, as illustrated in FIG. 12, the projected portions 91c and 92c at the plate members 91 and 92 (provided with grooves for clicking) of the slide cover come in contact with the upper and lower ends of the plate member 75 constituting the camera main body 10, and the slide cover 20 is further prevented from becoming lifted off frontward through these contacts.

Furthermore, as illustrated in FIG. 13, the end surface of the metal outer cover 21 in the closing direction is covered and hidden by the covering portion 22A of the inner cover 22 to maintain good visual appearance. In particular, by adopting the structure in which the outer cover end is fitted at the indented portion formed at the covering portion 22A instead of a structure in which a plastic member is merely placed in contact with the outer cover end surface, the covering portion 22A never comes off to expose the cover end even if a force is applied in the direction indicated by the arrow. Moreover, since the covering portion 22A is formed at the inner cover 22, which restricts the movement of the slide cover 20 in the opening direction, a reduction in the number of required parts and an improvement in the assembly work efficiency are achieved.

It is to be noted that while the guide member 30 at the cover has a length that corresponds to the stroke distance of the slide cover and the guide member 40 at the main body is formed shorter than the guide member 30, their dimensions may be set the reverse of this. In addition, indented portions may be formed at the cover guide member 30 and projected portions may be formed at the main body guide member 40 to connect and retain them together. Furthermore, while the outer cover 21 is constituted of metal, it may be constituted of a material other than metal (e.g., plastic).

As has been explained, in the camera according to the second embodiment, with a guide mechanism (constituted of the main body guide member and the cover guide member) for the slide cover provided at the approximate center of the camera rear side in the vertical direction, the thickness of the camera in the upper and lower portions can be reduced so that the camera appears smaller to achieve an improvement in the visual appearance.

By setting the length of the cover guide member, which is provided at the inner surface of the cover, in correspondence to the stroke distance of the slide cover, it is possible to minimize the length of the main body guide member so that the main body guide member is prevented from becoming exposed to the outside regardless of the open/closed state of the cover to further improve the visual appearance.

By providing contact portions that regulate the movement of the slide cover in the direction in which the slide cover would lift off from the front side or the rear side of the camera main body, at the main body guide member and the cover guide member, play in the slide cover along the depthwise direction of the camera is prevented.

Since the slide cover is constituted of a metal outer cover and a plastic inner cover, a covering portion is provided at the inner cover to cover and hide the end surface of the outer cover in the closing direction, it is not necessary to provide a special covering member, to achieve a reduction in the number of required parts and an improvement in the assembly work efficiency. In particular, by adopting a structure in which the outer cover end is fitted at an indented portion formed at the covering portion instead of a structure in which a plastic member is simply placed in contact with the outer cover end surface it is ensured that the covering portion does not come off to expose the cover end even if a force is applied in the direction indicated by the arrow (see FIG. 13).

With the guide mechanism that guides the movement of the slide cover provided at an approximate center of the camera in the vertical direction and the regulating mechanism that regulates the movement of the slide cover in the opening direction provided above and below the guide mechanism, the slide cover at the open position will not become tilted or loose, which would otherwise occur if the regulating mechanism is provided only at the center of the camera in the vertical direction.

Since a click mechanism that secures the slide cover at the closed position and at the open position is provided at two locations above and below the taking lens at the front side of the camera main body and also at a location at the center of the camera rear side, the slide cover does not make any undesirable movement from the closed position or the open position and, in addition, play in the slide cover in various directions is prevented by the three click mechanisms. By providing at least one of the click mechanisms at the regulating mechanism that regulates the movement of the slide cover, efficient use of space is achieved, since it is not necessary to secure a special area for providing the click mechanism.

By constituting the slide cover with a roughly cylindrical metal outer cover and a plastic inner cover, providing a slide cover guide member at the outer cover 21 and providing a restricting mechanism that restricts the movement of the slide cover in the opening direction at the inner cover, the inner cover can be mounted at the camera main body while undergoing elastic deformation and then the outer cover can be placed over the inner cover to achieve an improvement in the assembly work efficiency.

Since the inner cover is mounted at the camera main body from one end while undergoing elastic deformation so that the opening restriction portion provided at the inner cover can connect with the restricting portion at the camera main body and then the outer cover is mounted at the outer surface of the inner cover by connecting the slide guide member provided at the outer cover at the guide member at the camera main body to secure the outer cover to the inner cover, an improvement in the assembly work efficiency is achieved as explained earlier.

Since the slide cover is constituted of a roughly cylindrical metal outer cover and a plastic inner cover and the outer surface of the inner cover is made to incline to descend closer to the center of the camera main body toward its end in the opening direction, the plastic inner cover can be inserted through the inside of the outer cover from the end of the outer cover in the closing direction even in a structure in which the two covers are fitted together relatively tightly at their ends in the opening direction to ensure that play is prevented.

It is to be noted that the slide cover explained above in the second embodiment can be applied to the camera according to the first embodiment.

What is claimed is:

1. A camera comprising:
   a camera main body;
   a slide cover that makes a sliding movement between a camera non-operating position, at which, at least, a viewfinder objective lens window, a viewfinder eyepiece window, a function selection unit operated to select camera functions at the camera main body are covered, and a camera operating position at which the viewfinder objective lens window, the viewfinder eyepiece window and the function selection unit are exposed; and a loading unit that allows loading and removal of an image recording medium, regardless of whether said slide cover is at said operating position or said non-operating position.

2. A camera comprising:

a camera main body;

a sheath shaped slide cover that makes a sliding movement between a camera non-operating position at which, at least a lens barrel, a viewfinder objective lens window, a viewfinder eyepiece window and a battery chamber lid that opens and closes a battery chamber at the camera main body are covered and a camera operating position at which said lens barrel, the viewfinder objective lens window, the viewfinder eyepiece window and said battery chamber lid are exposed, said camera main body being sheathed into the sheath shaped slide cover at said camera non-operating position; and a cartridge chamber lid that opens and closes a film cartridge chamber where a film cartridge is loaded and is provided in an area of the camera main body that is exposed at all times regardless of the position of said slide cover.

3. A camera according to claim 2, wherein:

said battery chamber lid and the cartridge chamber lid are provided on a single surface of the camera main body.

4. A camera according to claim 2, further comprising:

a tripod mount that secures said camera to a tripod and is provided at said cartridge chamber lid.

5. A camera according to claim 2, further comprising:

a flash light-emitting unit, wherein said flash light-emitting unit is provided at a predetermined position on said slide cover so that said flash light-emitting unit is positioned further away from the lens barrel when said slide cover is at said camera operating position compared to when said slide cover is at said camera non-operating position.

* * * * *